(12) United States Patent
Orlosky

(10) Patent No.: US 7,513,222 B2
(45) Date of Patent: Apr. 7, 2009

(54) COMBUSTION-STEAM ENGINE

(76) Inventor: James Robert Orlosky, 18452 Wisecarver Truck Trail, Jamul, CA (US) 91935

(*) Notice: Subject to any disclaimer, the term of this patent is extended or adjusted under 35 U.S.C. 154(b) by 0 days.

(21) Appl. No.: 11/806,150

(22) Filed: May 30, 2007

(65) Prior Publication Data

US 2007/0277775 A1 Dec. 6, 2007

Related U.S. Application Data

(60) Provisional application No. 60/809,020, filed on May 30, 2006.

(51) Int. Cl.
*F02B 47/02* (2006.01)
(52) U.S. Cl. .................. 123/25 C; 123/25 J
(58) Field of Classification Search ........... 123/25 C, 123/25 J, 25 A, 1 A, 228, 198 A
See application file for complete search history.

(56) References Cited

U.S. PATENT DOCUMENTS

| 2,101,554 | A |   | 12/1937 | Meyer |
| 2,459,286 | A |   | 1/1949 | Rabezzana et al. |
| 4,031,864 | A | * | 6/1977 | Crothers ............... 123/1 A |
| 5,125,366 | A | * | 6/1992 | Hobbs ................. 123/25 C |
| 5,284,116 | A | * | 2/1994 | Richeson, Jr. ......... 123/406.2 |
| 6,411,038 | B2 | * | 6/2002 | Murai et al. ............ 315/55 |
| 6,606,973 | B2 | * | 8/2003 | Moe .................. 123/228 |

* cited by examiner

*Primary Examiner*—Michael Cuff
*Assistant Examiner*—Hyder Ali
(74) *Attorney, Agent, or Firm*—Alston & Bird LLP

(57) ABSTRACT

Systems and methods of controlling an internal combustion engine provide for a fuel combustion cycle that takes place in a combustion chamber of the engine. Injection of water into the combustion chamber during the fuel combustion cycle is controlled based on sensor input, such as temperature, extinguishment and pollution level input.

33 Claims, 4 Drawing Sheets

COMBUSTION-STEAM ENGINE

This application claims priority to U.S. Provisional Application Ser. No. 60/809,020, filed on May 30, 2006.

BACKGROUND

1. Technical Field

Embodiments of the invention generally relate to internal combustion engines. More particularly, embodiments relate to internal combustion engines that use water injection.

2. Discussion

The internal combustion engine (ICE), which is a cornerstone of the transportation and other industries, has long been the subject of considerable research. Many ICE's, such as standard four cycle and two cycle engines derive power from the combustion of fuel/air mixtures. For example, the ignition of hydrocarbon fuel, such as gasoline, propane, natural gas, or diesel is often used to force piston movement, which in turn rotates a crank shaft to transfer power to the wheels of a vehicle. Despite the popularity of these conventional ICE designs, a number of challenges remain. For example, in order to increase the power output of a conventional engine, it is often necessary to increase the number of combustion chambers (i.e., "cylinders"), which essentially provides the opportunity to increase the amount of fuel available for combustion over a given period of time. Unfortunately, this fuel increase tends to add to the cost of operation—particularly in situations where the price of fuel is relatively high.

Conventional ICE's also face significant obstacles with regard to toxic emissions. Indeed, the tightening of governmental emissions standards in the automotive industry is well documented and the subject of considerable debate. In order to meet these standards, automotive manufacturers may be under increased pressure to develop more advanced exhaust systems, such as enhanced catalytic converters, which can lead to increased manufacturing costs.

Another concern with conventional ICEs centers around the heat generated by the combustion cycle. In particular, engine designers are often forced to implement complex cooling systems to combat overheating. Other solutions involve constructing virtually all engine components out of high-temperature metals. Each of these solutions can further increase costs. In addition, any excess heat that is successfully removed from the system is generally treated as waste.

Although more recent engine development efforts have resulted in the design of a six cycle steam combustion engine, which uses two additional cycles to generate power from steam, there remains considerable room for improvement. In the six cycle engine, for example, once the combustion stroke has terminated and the exhaust gases have been lost and discharged via the exhaust stroke, water is injected in order to create vapor from the leftover heat. The vaporization pushes the piston down to develop a pressure steam stroke. At the end of the pressure steam stroke, a wet condition typically exists within the cylinder. As a result, the six cycle engine may fail to be as efficient as possible (or may be rendered inoperable) in cold weather environments.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments of the invention provide for an internal combustion engine having a cylinder block, a water injection system and a controller. The cylinder block has surfaces defining one or more combustion chambers, wherein a fuel combustion cycle of the engine takes place within the combustion chamber. The water injection system is coupled to the combustion chamber and the controller controls injection of fuel from a fuel injection system and water from the water injection system into the combustion chamber during the fuel combustion cycle. As a result, a number of advantages over conventional engine designs can be achieved.

Figure 1:
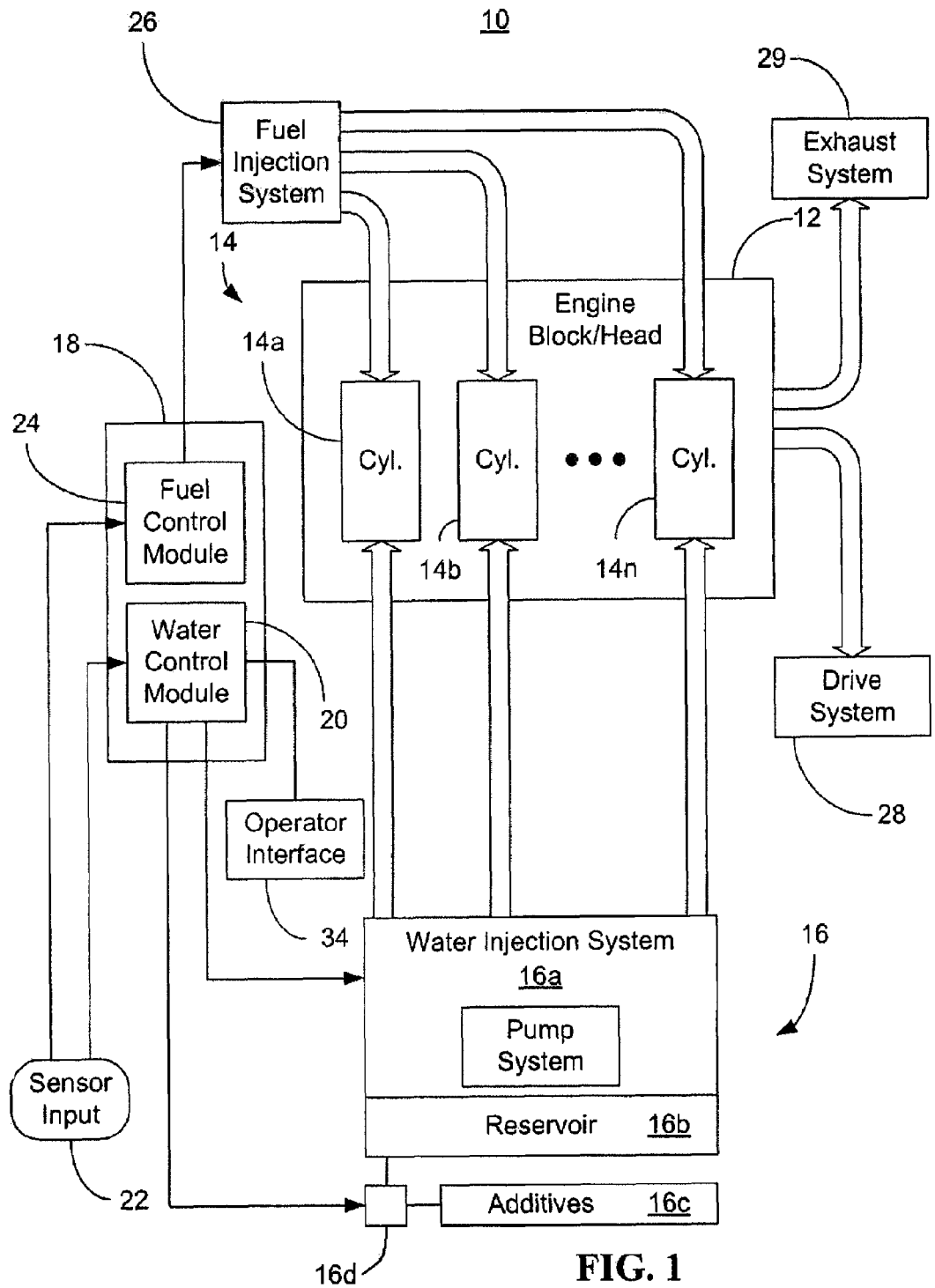
FIG. 1 is a block diagram of an example of an internal combustion engine according to an embodiment of the present invention.

FIG. 1 shows an internal combustion engine (ICE) 10 according to one embodiment of the invention. The illustrated ICE 10 has an engine block/head 12 in which surfaces define one or more cylinders 14 (14a-14n), which operate as combustion chambers. The number of cylinders may vary depending upon the circumstances. For example, the ICE 10 may be a "V4", "V6", "inline 6 cylinder", etc., type of engine. The ICE 10 may also be designed to have a number of cycles or strokes, such as a two cycle or four cycle design, wherein a fuel combustion cycle may take place sequentially in one or more of the cylinders 14. A water injection system 16 (16a-16c) is coupled to each combustion chamber 14, wherein the illustrated water injection system 16 includes a pump system, a water reservoir 16b and an additive reservoir 16c. The additive reservoir 16c may contain several additives. Therefore, high sulfur fuels or fuels without significant refining may be used without experiencing negative effects upon the exhausted pollutants. Such an approach would save refining costs and result in reduced fuel costs.

The illustrated ICE 10 also includes a controller 18 having a water control module 20 that is capable of controlling the injection of water from the water injection system 16 into the cylinders (i.e., combustion chambers) 14 during their respective fuel combustion cycles. The water control module 20 of the controller 18 may be separate from, contained within, or otherwise a part of, the water injection system 16. In the illustrated example, the water control module 20 uses sensor inputs 22 to control injection of the water into the cylinders 14. As will be described in greater detail, control of the water injection can involve determining the timing for water injection, the duration (or amount) of water injection and/or the nature and extent to which exhaust scrubbing additives in the additive reservoir 16c may be incorporated into the water contained in the water reservoir 16b.

The controller 18 of the ICE 10 may also include a fuel control module 24, which is able to control the injection of a fuel/air mixture into the cylinders 14 via a fuel injection system 26. The fuel control module 24 may communicate with the water control module 20 to determine the optimum amount and timing of fuel to be injected. For example, as the engine water injection system 16 begins to inject, the amount of fuel can be made to drop off. Thus, in such a design the key may not be to prevent full combustion of the fuel by injecting water early, but to reduce the amount of fuel so that as the fuel fully burns, the water is injected before the piston bottoms out from the power stroke to create steam that increases horse power. Simply put, in the illustrated ICE 10, flames would not come out of the exhaust headers due to the cooperative operation of the fuel control module 24 and the water control module 20. Power derived from the operation of the illustrated ICE 10 is delivered to a drive system 28 and exhaust products, if any, may be removed from the ICE 10 via an exhaust system 29.

FIG. 1 shows an internal combustion engine (ICE) 10 according to one embodiment of the invention. The illustrated ICE 10 has an engine block/head 12 in which surfaces define one or more cylinders 14 (14a-14), which operate as combustion chambers. The number of cylinders may vary depending on the circumstances. For example, the ICE 10 may be a "V4", "V6", "inline 6 cylinder", etc., type of engine. The ICE 10 may also be designed to have a number of cycles or strokes, such as a two cycle or four cycle design, wherein a fuel combustion cycle may take place sequentially in one or more of the cylinders 14. A water injection system 16 (16a-16d) is coupled to each combustion chamber 14, wherein the illustrated water injection system 16 includes a pump system, a water reservoir system 16b, an additive reservoir 16c and a valve 16d to transfer an additive from the additive reservoir to the water reservoir based on a signal from the controller. The additive reservoir 16c may contain several additives. Therefore, high sulfur fuels or fuels without significant refining may be used without experiencing negative effects upon the exhausted pollutants. Such an approach would save refining costs and result in reduced fuel costs.

The illustrated water control module 20 controls the injection of water in the ICE 10 such that controlling the quality and amount of water injected achieves a number of advantages over conventional combustion engines. For example, injected water that turns to steam keeps the engine much cleaner, and as much heat as possible is removed from the engine immediately after combustion. In addition, water injection into the engine may be limited/tightly controlled so that 100% of the water injected is transformed into steam without leaving a wet condition that would detract from combustion in the following engine combustion cycle. Furthermore, water injection can develop precise steam pressure within a combustion piston chamber to drive the pistons at the most optimum interval, and steam can scrub the combustion gases with certain active chemicals to reduce pollutants from being discharged through the exhaust system, which may also eliminate the need for catalytic converters on combustion engines. To achieve the goals stated above and provide excellent water injection, the illustrated water control module 20 is programmed to evaluate a wide variety of conditions and inject treated water at optimum intervals after combustion occurs in a combustion engine.

Figure 2:
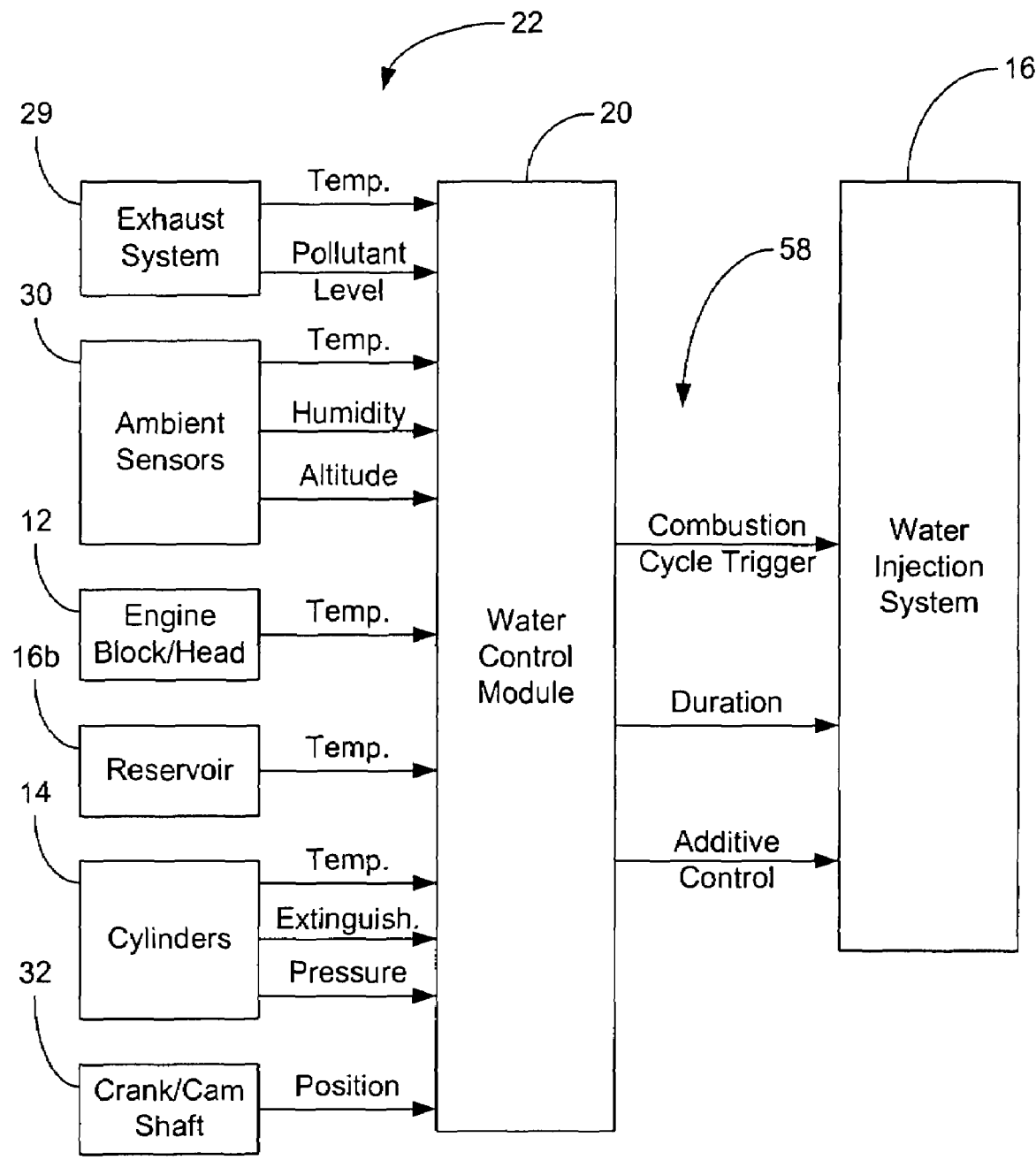
FIG. 2 is a block diagram of an example of a water control module according to an embodiment of the present invention.

Turning now to FIG. 2, one example of the types of sensor inputs 22 used by the water control module 20 to treat and inject water is shown in greater detail. In the illustrated example, temperature data and pollutant level data is obtained from the exhaust system 29, temperature, humidity and altitude data is obtained from ambient sensors 30, and temperature data is obtained from the engine block/head 12. In addition, the water control module 20 may communicate with sensors from the water reservoir 16b to obtain temperature data, sensors from the cylinders 14 to obtain temperature, pressure and extinguishment data and a crank/camshaft 32 to obtain position data. The result is one or more control signals 58 that can set the triggering, duration and additive levels of the injected water. While the water injection signals are illustrated as separate signals, other approaches, such as a pulsed signal that triggers on the rising (or falling) edge and uses its duty cycle to indicate duration, may be used. A similar approach may be used to signal additive insertion.

Thus, the controller/water control module 20 can look at many important conditions to achieve a precise quantity of water injection at a precise moment during the combustion cycle. Conditions the illustrated water control module 20 evaluates prior to injection of water into the combustion chamber are summarized below.

The water control module 20 can look at the treated water reservoir 16b to ensure that there is enough water and that appropriate water additives are available to operate the overall water injection system 16. If not, the controller 18 may display warning codes and/or lights for the operator via an operation interface 34 (FIG. 1).

The water control module 20 can use ambient sensors 30 to measure the temperature of the outside air and use this temperature, and other data collected simultaneously, to calculate the amount of water that will be injected into the engine and the precise moment to inject. The ambient sensors 30 can also provide the water control module 20 with humidity and altitude data for determination of the water injection moment and duration.

The water control module 20 can sense the temperature of the engine block/head 12 and use this temperature, and other data collected simultaneously, to calculate the amount of water that will be injected into the engine and the precise moment to inject.

The water control module 20 can sense the temperature of the treated water in reservoir 16b and use this temperature, and other data collected simultaneously, to calculate the amount of water that will be injected into the engine and the precise moment to inject.

The water control module 20 can also communicate with the exhaust system 29 to determine the temperature of the exhaust and use this temperature, and other data collected simultaneously, to calculate the amount of water that will be injected into the engine and the precise moment to inject.

The water control module 20 can sense a pressure drop within the combustion chamber after combustion and use this information, and other data collected simultaneously, to calculate the amount of water that will be injected into the engine and the precise moment to inject.

In addition, the water control module 20 may sense variations in the pure water supply (for example, clean water can be added periodically) and inject additives as required into the pure water supply tank to neutralize chemical compounds and/or ionic exhaust gas compounds to reduce pollutants in the exhaust gas during the production of steam. Fuel may vary in sulfur and other chemical content, and the additives in the water supply tank can be adjusted to permit the chemicals to actively neutralize air pollutants in the exhaust gas before the exhaust gases exit the combustion chamber.

The water control module 20 can sense the position of the crankshaft and/or camshaft 32 and use this information, and other data collected simultaneously, to calculate the timing of when water will be injected into the engine.

The water control module 20 can sense the amount of pollutants in the exhaust and make adjustments to additives in the injected water system to reduce air borne air pollutants and use this information, and other data collected simultaneously, to calculate the amount of water that will be injected into the engine and the precise moment to inject.

Furthermore, the water control module 20 may sense the extent of extinguishment of combustion in the combustion chamber/cylinder 14 through a sensor and use this information, and other data collected simultaneously, to calculate the exact moment to inject water into the combustion chamber.

In all of the conditions above, if the water control module 20 senses any condition that can be corrected by the operator, or sensor failure, the water control module 20 may send a failure code and/or warning light to the operator via the operation interface 34 (FIG. 1) and adjust water and fuel injection accordingly.

As inputs such as the inputs 22 described above are collected, the illustrated water control module 20 causes the water injection system 16 to release a precise amount of high pressure injection treated water into the piston chamber at a precise moment in time and adjusts the amount of fuel injected as well. The exact moment in time when high pressure water will be injected in the combustion chamber can be determined as follows. Using the inputs 22 described above, after all or the majority of fuel in the combustion chamber has burned, if the engine is a two stroke or four stroke engine, the injection of water can occur sometime after the water control module 20 senses a pressure and/or heat drop in the combustion chamber, partial or complete extinguishment of combustion, and/or, as indicated by a specific point in revolution of the crankshaft or camshaft as sensed and/or calculated by the controller. For a six cycle engine, the water control module 20 can inject water at a precise moment when the piston is near, past, or at top dead center of the steam stroke using the data collected from the various sensors as already discussed. The system can have an exhaust condenser that condenses the steam into water for reuse, and then the condensed water may pass through a filter. The filtered water can then be pumped into the water reservoir for reuse if the controller determines the condensed water meets certain quality standards.

Figure 3:
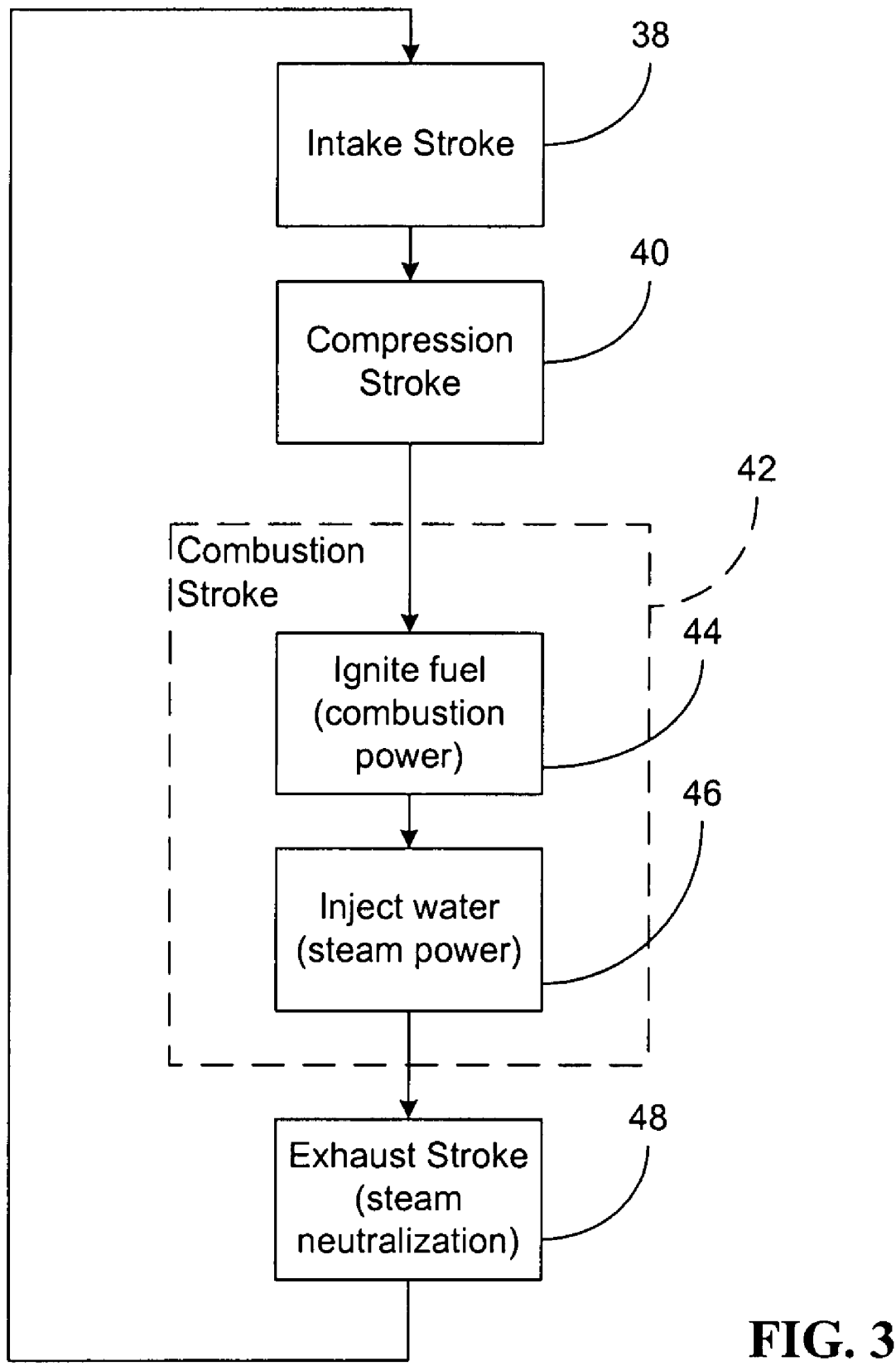
FIG. 3 is a flowchart of an example of a method of controlling an engine according to an embodiment of the present invention.

Thus, the above approach incorporates water injection into the combustion stroke of an engine in order to provide a number of advantages. FIG. 3 shows a method 36 of controlling an internal combustion engine according to one embodiment of the invention. The method 36 may be implemented sequentially for each combustion chamber of an internal combustion engine, such as ICE 10 (FIG. 1) as software, hardware, firmware, or any combination thereof. In the illustrated example, an intake stroke occurs at processing block 38 in which the downward stroke of a piston draws fuel into the combustion chamber. This stroke is sometimes referred to as the induction stroke. The fuel may be made up of a mixture of air and petrol, which is ignitable. Block 40 provides for a compression stroke during which the fuel/air mixture is compressed by an upward stroke of the piston. A combustion stroke is illustrated at block 42. This stroke is sometimes referred to as the power stroke. In the illustrated example, the fuel/air mixture is ignited at block 44 to provide combustion power. One approach to ignition can involve the use of a spark plug. Block 46 provides for the injection of water into the combustion chamber to obtain additional steam power between approximately eighty-five percent and fifty percent of the combustion stroke. Simultaneously, during the transformation of water to steam, the additives from the treated water vapor impregnate the pollutants during the combustion stroke and neutralizes them. For example, by neutralizing (e.g., changing the valence of) activated carbon, the carbon may no longer adhere to the surfaces of the combustion chamber, piston and cylinder head. An exhaust stroke is illustrated at block 48, wherein the exhaust stroke provides the opportunity for further neutralization and expulsion of the exhaust gases. In the illustrated example, the cycle then repeats. As already noted, other combustion cycle designs, such as two stroke or six stroke designs may also incorporate the injection of water into the combustion stroke.

Combustion piston driven type engines may also be converted and/or constructed to operate using water injection into the combustion chamber to develop steam pressure after combustion that forces the piston down during the power stroke of a common combustion engine. Any type of fuel injection system, be it common rail or conventional type injection systems, or gasoline carburetion and/or turbo charged combustion engines, may be modified to permit the new technology to be installed on any combustion type piston driven engine. The head of a new or old engine may be converted in one of several ways to take advantage of this new technology as described below.

Figure 4:
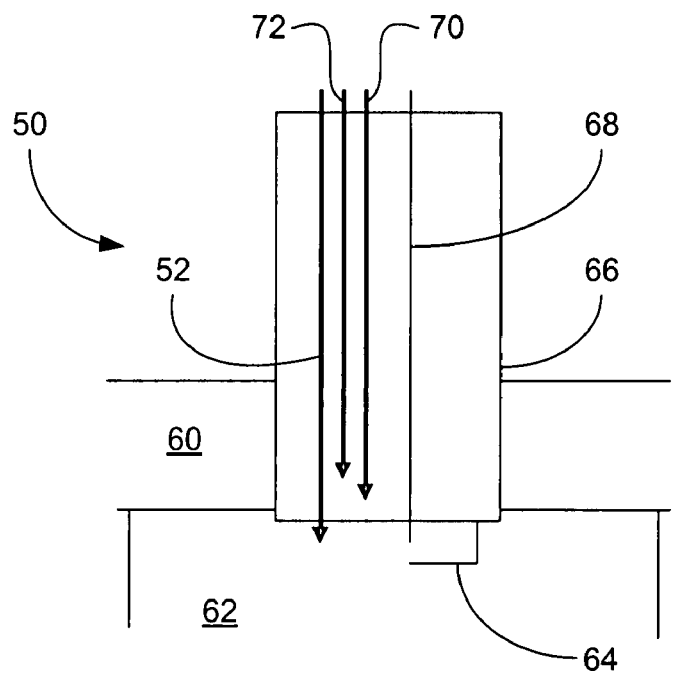
FIG. 4 is a block diagram of an example of a water injection solution according to an embodiment of the present invention.

In existing gasoline engines that use spark plugs, one embodiment, as shown in FIG. 4, involves a spark plug 50 that is coupled to (e.g., screwed into) a head 60 of a combustion chamber 62. The illustrated spark plug 50 has a first electrode 64 and a housing 66 containing a second electrode line 68, a light (e.g., infrared) sensor line 70, a temperature sensor line 72 and a water injection nozzle 52 that run parallel with the spark plug interior wall. The spark plug 50 may therefore have a spark plug wire connection and a threaded tube connection for high pressure injection water to enter the water injection nozzle 52. Thus, in the illustrated example, the water injection nozzle 52 is coupled to the combustion chamber 62 via the spark plug 50. There are at least two ways in which the high pressure water injection system may operate, one by conventional high pressure delivery from an injector pump driven by mechanically means via the crankshaft that delivers water to each cylinder independently, and second by common rail injection where an electronic signal is sent by the controller to cause an injector to release an exact amount of water into the combustion chamber at a precise moment. Other approaches are also possible.

Figure 5:
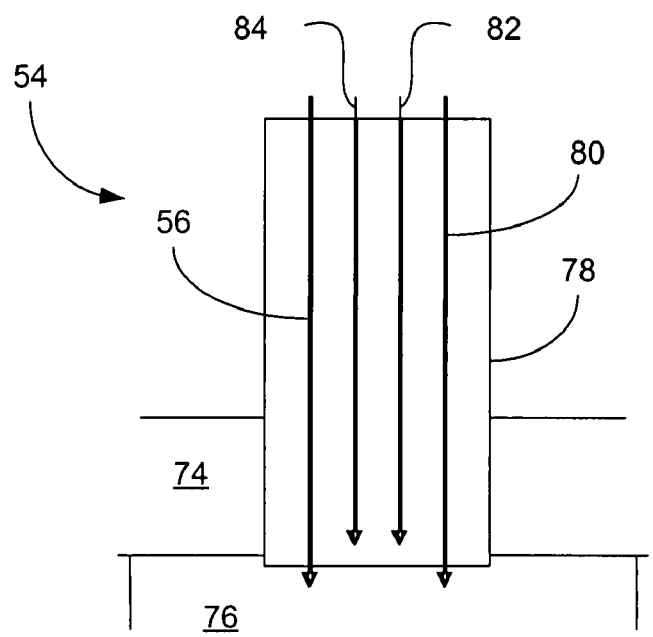
FIG. 5 is a block diagram of an example of a water injection solution according to an alternative embodiment of the present invention.

In another embodiment of a fuel injection gasoline or diesel engine, FIG. 5 illustrates a fuel injector 54 that is coupled (e.g., screwed into) a head 74 of a combustion chamber 76. The illustrated fuel injector 54 has a housing 78 that contains a fuel injection line 80, a light sensor line 82, a temperature sensor line 84 and a water injection nozzle 56. Thus, the water injection nozzle 56 may be installed next to the fuel injection line 80, where each fuel injector 54 can have a fuel line and a high pressure water line attached to it. Thus, in the illustrated example, the water injection nozzle 56 is coupled to the combustion chamber 76 via the fuel injector 54. There are at least two ways in which the high pressure water injection system may operate, one by conventional high pressure delivery from an injector pump driven by mechanically means via the crankshaft that delivers water to each cylinder independently, and second by common rail injection where an electronic signal is sent by the controller to cause an injector to release an exact amount of water into the combustion chamber at a precise moment. Other approaches are also possible.

In yet another embodiment, a new hole may be drilled and threaded into the cylinder head that will provide a point of entry for the new water injection nozzle to be installed. This method, in which the water injection nozzle is directly coupled to the combustion chamber, may be used for spark plug combustion piston driven engines or fuel injection combustion piston driven engines.

An engine according to one embodiment of the present invention contains a separate computer controller for injection of water in a combustion engine. For combustion engines old and new, a new cylinder head can be installed on an engine to provide two injection ports, one for a fuel injector or a spark plug and one for a water injection nozzle. Alternatively, a cylinder head can be installed on an engine using a dual injector where one port on the injector is used to inject fuel in the engine and one port is used to inject water in the engine. There may be installed, but it is not required, a pressure sensor in the combustion chamber of any cylinder head, or in the new invented injector, that can detect a drop in combustion pressure so that the steam cycle can be better controlled. There may be installed, but it is not required, a combustion sensor in the combustion chamber of any cylinder head, or in the new invented injector, that can detect a drop in combustion (i.e., level of extinguishment) so that the steam cycle can be better controlled.

Thus, a steam powered combustion engine according to one embodiment of the invention can operate as follows. In general, for standard combustion engines that are converted to use treated water injection, after the ignition of the hydrocarbon fuel, be it gasoline, propane, natural gas, diesel or other forms of hydrocarbon fuel, upon ignition of the hydrocarbon fuel the force of the internal explosion begins to force the piston down and turn the crankshaft. At a moment chosen by the computer controller/water control module after the piston chamber explosion has begun to drive the piston down, the force of the explosion begins to dissipate, and at or near that moment a precise amount of treated water is injected into the piston combustion chamber. At the moment that water is injected into the combustion chamber the water turns from a liquid to vapor, (steam vapor) this conversion from a liquid to steam causes an immediate burst of very high pressure steam energy which causes the piston to be driven downward at tremendous force. Simultaneously as the water is injected into the combustion chamber the steam mixes thoroughly with the exhaust gases under pressure which causes a chemical reaction within the gases that neutralizes the exhaust gases. The steam collects the activated carbon particles and exhaust gases from the cylinder head, piston, cylinder walls and sensors and neutralizes them during the combustion cycle, and expels the neutralized exhaust gases during the exhaust cycle (see below).

When the exhaust gases are discharged through the exhaust opening or valve, the exhaust gases have been cooled and the corrosive and polluting exhaust chemicals or compounds have been neutralized and the carbon has been collected from the walls of the cylinder, the cylinder head, from the top of the piston and from the sensors. Because the exhaust gases were bombarded with water vapor at the exact moment after the gases passed the highest temperature, the majority of the heat (measured in btu's/British Thermal Units) generated from combustion were used to create the steam pressure. Therefore, the engine obtains full use of the heat from the fuel and runs very cool and has no need of a cooling system. By contrast, in conventional combustion engines the waste heat is unnecessarily lost and a certain percentage of horse power is consumed cooling the engine.

The six cycle steam combustion engine was invented in 2005 and uses four cycles of six to generate power. Two are the fuel burning cycle and two are the steam cycle. Of particular note is that there is no known computer controller for the six cycle engine design. A controller as described herein could be used to control all aspects of that type of engine, if the six cycle engine proves viable for commercial use. As already noted, however, the conventional six cycle engine may be limited in use as cold weather will decrease engine performance and the loss of the exhaust heat is counter productive.

A key to the combustion steam engine working properly is the use of data from the computer controller to make adjustments in the amount of treated water injected and the precise moment to make the injection. For instance, when the engine is very cold no water may be injected until the engine comes up to temperature and in cold climates the amount of water may be greatly reduced or totally suppressed depending upon ambient temperature. Therefore, in colder climates the combustion steam engine may not run as efficiently as it would in warmer climates. For the six cycle engine, cold climates could prevent its operation all together as the engine could not run on two of six cycles. The two and four cycle engines outlined herein, however, run efficiently in all weather conditions.

When water is injected, the water can provide two important mechanical benefits—the water develops a tremendous amount of steam force to push the piston down and the water removes substantially all of the heat from the engine. This total utilization of waste heat can allow the engine to run much cooler than other combustion engines and will not require any type of air or water cooling systems on the engine, greatly reducing weight, maintenance, the loss of horse power to cool the engine and cost of the engine.

Due to the engine running at very low heat, the engine can be built of plastic where only the cylinders, head surfaces and other moving and contacting moving parts need be constructed of metal. Even the exhaust system could be made of plastic.

When water is injected into the engine the steam cleans the combustion chamber and the steam carries that soot and carbon out of the engine to the exhaust. In this new invented combustion/steam engine, unlike the six cycle engine, water vapor is simultaneously mixed after the fuel burn under extreme heat and pressure. Therefore, more carbon is removed from the combustion chamber and discharged with the exhaust gas. Therein, there is much less carbon migrating to the engine oil, extending the life of the engine wear surfaces and the engine oil.

In combustion/steam engine embodiments described herein, no catalytic converter is required as all of the exhaust gases can be scrubbed by chemicals in the water injected under extreme pressure. The efficiency of the invented combustion/steam engine may vary as to weather conditions but provides an improvement in fuel economy over conventional combustion engines due to the development of steam power through water injection (steam pressure) to use available btu's.

The environmental benefits are tremendous as the combustion gases are thoroughly mixed and scrubbed under very high pressure with pretreated water before the combustion gas is released from the cylinder. The affect of injecting treated water under high pressure results in substantial neutralization of Carbon, NOx, $CO_2$, Ozone and other ionic gaseous compounds through maintaining correct additives in the injected water. By providing neutralizing chemicals in the water being injected under extreme pressure within the confined space of the combustion chamber, chemical change to the exhaust gases is more effective. Therein, it is estimated that the majority of all present gases found in conventional combustion engines will be eliminated from the atmosphere using this new technology.

If water is injected immediately after fuel combustion is substantially complete, the force and effect of the water transformation to steam is much greater than that of a six cycle engine, where the water is injected after the exhaust gas has been pushed out of the engine. Accordingly, embodiments described herein represent a substantial improvement over the six cycle combustion/steam engine.

The term "coupled" is used herein to refer to any type of relationship, direct or indirect, between the components in question, and may apply to electrical, mechanical, fluid, optical, electromagnetic, electromechanical or other connections.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claim.

I claim:

1. An internal combustion engine comprising:
   a cylinder block having surfaces defining a plurality of combustion chambers, a fuel combustion cycle of the engine to sequentially take place within each of the plurality of combustion chambers;
   a water injection system having an additive reservoir, a water reservoir, a pump system coupled to the water reservoir and the additive reservoir, and an injection nozzle coupled to the pump system and the combustion chamber; and
   a controller having a water control module with a plurality of sensor inputs, the water control module to determine water injection moments and water injection durations based on data from the plurality of sensor inputs and to control injection of water from the water reservoir into each of the plurality of combustion chambers during each fuel combustion cycle based on each water injection moment and duration, the water injection system to transfer an additive from the additive reservoir to the water reservoir based on an additive control signal from the water control module.

2. The internal combustion engine of claim 1, wherein each water injection moment is to occur after fuel combustion is substantially complete within a corresponding combustion chamber.

3. The internal combustion engine of claim 2, wherein the plurality of sensor inputs are selected from a group comprising a crank shaft position input, an exhaust input, an ambient input, an engine block temperature input, a reservoir temperature input and a combustion chamber input.

4. The internal combustion engine of claim 1, wherein the injection nozzle is coupled to the combustion chamber via a spark plug.

5. The internal combustion engine of claim 1, wherein the injection nozzle is coupled to the combustion chamber via a fuel injector.

6. The internal combustion engine of claim 1, wherein the injection nozzle is directly coupled to the combustion chamber.

7. An internal combustion engine comprising:
   a cylinder block having surfaces defining a combustion chamber, a fuel combustion cycle of the engine to take place within the combustion chamber;
   a water injection system coupled to the combustion chamber; and
   a controller to control injection of water from the water injection system into the combustion chamber during the fuel combustion cycle;
   wherein the water injection system comprises:
      a water reservoir;
      a pump coupled to the water reservoir;
      an injection nozzle coupled to the pump and the combustion chamber;
      an additive reservoir; and
      a valve to transfer an additive from the additive reservoir to the water reservoir based on a signal from the controller.

8. The internal combustion engine of claim 7, wherein the controller includes a water control module having a plurality of sensor inputs, the water control module to determine a water injection moment and duration based on data from the plurality of sensor inputs.

9. The internal combustion engine of claim 8, wherein the water injection moment is to occur after fuel combustion substantially is complete.

10. The internal combustion engine of claim 8, wherein the plurality of sensor inputs are selected from the group consisting of a crank shaft position input, an exhaust input, an ambient input, an engine block temperature input, a reservoir temperature input and a combustion chamber input.

11. The internal combustion engine of claim 10, wherein the exhaust input is selected from the group consisting of an exhaust temperature input and an exhaust pollutant level input.

12. The internal combustion engine of claim 10, wherein the ambient input is selected from the group consisting of an ambient temperature input, an ambient humidity input and an ambient altitude input.

13. The internal combustion engine of claim 10, wherein the combustion chamber input is selected from the group consisting of a combustion chamber temperature input, a combustion chamber extinguishment input and a combustion chamber pressure input.

14. The internal combustion engine of claim 7, wherein the injection nozzle is coupled to the combustion chamber via a spark plug.

15. The internal combustion engine of claim 7, wherein the injection nozzle is coupled to the combustion chamber via a fuel injector.

16. The internal combustion engine of claim 7, wherein the injection nozzle is directly coupled to the combustion chamber.

17. A method of controlling an internal combustion engine, comprising:
   drawing a fuel and air mixture into a combustion chamber during an intake stroke of a piston associated with the combustion chamber;
   compressing the fuel and air mixture within the combustion chamber during a compression stroke of the piston;
   igniting the fuel and air mixture within the combustion chamber to obtain combustion power during a combustion stroke of the piston;
   injecting at least one additive into a water reservoir based on an additive control signal; and
   injecting water from the water reservoir into the combustion chamber to obtain steam power during the combustion stroke of the piston.

18. The method of claim 17, further including determining a water injection moment and duration based on data from a plurality of sensor inputs, wherein the injecting is conducted based on the water injection moment and duration.

19. The method of claim 18, wherein the injecting is conducted immediately after fuel combustion is substantially complete within the combustion chamber.

20. The method of claim 17, wherein the at least one additive that neutralizes pollutants in the exhaust gases in the combustion chamber during the combustion stroke.

21. A water injection system for an internal combustion engine comprising:
   a water reservoir;
   a pump coupled to the water reservoir;
   an injection nozzle coupled to the pump, wherein the injection nozzle is adapted to inject water from the reservoir into a combustion chamber, provide spark to the combustion chamber, and sense at least one condition within the combustion chamber;
   an additive reservoir; and
   an additive injector for injecting an additive into the water reservoir.

22. The water injection system of claim 21, wherein the at least one condition is a combustion event.

23. The water injection system of claim 21, wherein the injection nozzle is adapted to be inserted into a spark plug bore of a conventional internal combustion, spark-ignition engine.

24. The water injection system of claim 21, wherein the injection nozzle is adapted to be inserted into a fuel injector bore of a direct-injection internal combustion engine.

25. The water injection system of claim 21, wherein the water injection nozzle is controlled by a controller.

26. The water injection system of claim 21, wherein the additive injector is controlled by a controller.

27. A water injection system for an internal combustion engine comprising:
   a water reservoir;
   a pump coupled to the water reservoir;
   an injection nozzle coupled to the pump, wherein the injection nozzle is adapted to inject water from the reservoir into a combustion chamber, inject fuel into the combustion chamber and sense at least one condition within the combustion chamber;
   an additive reservoir; and
   an additive injector for injecting an additive into the water reservoir.

28. The water injection system of claim 27, wherein the at least one condition is a combustion event.

29. The water injection system of claim 27, wherein the injection nozzle is adapted to be inserted into a spark plug bore of a conventional internal combustion, spark-ignition engine.

30. The water injection system of claim 27, wherein the injection nozzle is adapted to be inserted into a fuel injector bore of a direct-injection internal combustion engine.

31. An additive system for a water injection system of an internal combustion engine comprising:
   an additive reservoir;
   an injector coupled to the additive reservoir configured to transfer an additive from the additive reservoir to a water reservoir;
   at least one sensor configured to detect at least one pollutant in emissions from the internal combustion engine; and
   a controller adapted to receive a signal from the at least one sensor and control the injector in response to the signal.

32. The additive system of claim 31, wherein the additive is a chemical or compound that reduces the at least one pollutant when injected into the combustion chamber of the internal combustion engine.

33. The additive system of claim 31, wherein the water reservoir mixes the additive with the water to form a substantially homogeneous mixture.

* * * * *

UNITED STATES PATENT AND TRADEMARK OFFICE
CERTIFICATE OF CORRECTION

| | | |
|---|---|---|
| PATENT NO. | : 7,513,222 B2 | Page 1 of 2 |
| APPLICATION NO. | : 11/806150 | |
| DATED | : April 7, 2009 | |
| INVENTOR(S) | : Orlosky | |

It is certified that error appears in the above-identified patent and that said Letters Patent is hereby corrected as shown below:

Column 2, Lines 29 - 47, delete the existing paragraph beginning "FIG. 1" and replace it with the following paragraph which is located in the Letters Patent in Column 3, beginning lines 15-35:

--FIG. 1 shows an internal combustion engine (ICE) 10 according to one embodiment of the invention. The illustrated ICE 10 has an engine block/head 12 in which surfaces define one or more cylinders 14 (14a – 14), which operate as combustion chambers. The number of cylinders may vary depending on the circumstances. For example, the ICE 10 may be a "V4", "V6", "inline 6 cylinder", etc., type of engine. The ICE 10 may also be designed to have a number of cycles or strokes, such as a two cycle or four cycle design, wherein a fuel combustion cycle may take place sequentially in one or more of the cylinders 14. A water injection system 16 (16a-16d) is coupled to each combustion chamber 14, wherein the illustrated water injection system 16 includes a pump system, a water reservoir system 16b, an additive reservoir 16c and a valve 16d to transfer an additive from the additive reservoir to the water reservoir based on a signal from the controller. The additive reservoir 16c may contain several additives. Therefore, high sulfur fuels or fuels without significant refining may be used without experiencing negative effects upon the exhausted pollutants. Such an approach would save refining costs and result in reduced fuel costs.--

Column 3, Lines 15 - 35, replace the paragraph beginning "FIG. 1" with the following paragraph which is the original paragraph 16 of the filed specification.

--The controller 18, and in particular the water control module 20, may be implemented as hardware, software, firmware, and any combination thereof. For example, the water control module 20 maybe implemented as a set of instructions stored on a machine readable medium such as read only memory (ROM), random access memory (RAM), flash memory, etc., where, when executed by a processor, the instructions are operable to control the treatment and injection of water into the cylinders 14. In another example, the water control module 20 may be implemented as

UNITED STATES PATENT AND TRADEMARK OFFICE
CERTIFICATE OF CORRECTION

PATENT NO. : 7,513,222 B2
APPLICATION NO. : 11/806150
DATED : April 7, 2009
INVENTOR(S) : Orlosky It is certified that error appears in the above-identified patent and that said Letters Patent is hereby corrected as shown below:

instructions programmed in an electrically erasable programmable read only memory (EEPROM) or other firmware, or as fixed functionality hardware, such as an embedded controller using complementary metal oxide semiconductor (CMOS) technology or transistor-transistor-logic (TTL) technology.--

Signed and Sealed this

Twenty-second Day of December, 2009

David J. Kappos
*Director of the United States Patent and Trademark Office*